US012608748B2

(12) United States Patent
Venkataraman et al.

(10) Patent No.: US 12,608,748 B2
(45) Date of Patent: Apr. 21, 2026

(54) REAL-TIME FINANCIAL SWEEPS MANAGEMENT SYSTEM AND METHOD

(71) Applicant: Morgan Stanley Services Group Inc., New York, NY (US)

(72) Inventors: Prakash Venkataraman, Princeton, NJ (US); Arjun Sabharwal, New York, NY (US); Sven Gauggel, Wiltshire (GB); Vaibhav Pendse, Jersey City, NJ (US); Shrushti Parikh, Arlington, VA (US); Josh Matthews, Northvale, NJ (US); Mohan Jha, Pune (IN)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 18/365,599

(22) Filed: Aug. 4, 2023

(65) Prior Publication Data

US 2025/0045831 A1     Feb. 6, 2025

(51) Int. Cl.
*G06Q 40/06* (2012.01)
*G06Q 40/02* (2023.01)

(52) U.S. Cl.
CPC ............. *G06Q 40/06* (2013.01); *G06Q 40/02* (2013.01); *G06Q 40/022* (2025.08)

(58) Field of Classification Search
USPC ........................................................ 705/36
See application file for complete search history.

(56) References Cited

U.S. PATENT DOCUMENTS 7,668,771 B1 *   2/2010   Bent ...................... G06Q 40/08
                                                      705/35
7,672,901 B1 *   3/2010   Bent ...................... G06Q 40/00
                                                      705/35
(Continued)

FOREIGN PATENT DOCUMENTS

CN          116562875 A   *   8/2023   ......... G06Q 20/3825

OTHER PUBLICATIONS

Titel: DeepTrax: Embedding Graphs of Financial Transactions Authors: C. Bayan Bruss et al. Date: Jul. 16, 2029 Published: Cornell University (Year: 2019).*

*Primary Examiner* — Bennett M Sigmond
*Assistant Examiner* — Yongsik Park
(74) *Attorney, Agent, or Firm* — Leason Ellis LLP

(57) ABSTRACT

A system and method are configured to perform real-time financial sweeps management. The system includes a processor, a memory, and a set of modules including a sweeps processing module, a sweeps allocation module, a file processing module, and a transaction pre-processing module. The sweeps processing module includes a policy-implementing pipeline. The file processing module process files including client information, and loads the processed files into the sweeps processing module. The transaction pre-processing module processes received financial transactions, formats the financial transactions, and loads the formatted financial transactions into the sweeps processing module. The sweeps processing module applies the processed files and the formatted financial transactions to the policy-imple- (Continued)

menting pipeline to generate sweeps allocation data. The sweeps allocation module performs an allocation of financial values to implement a financial sweep. The financial transactions can be reprocessed to roll back the financial transactions. The method implements the system.

14 Claims, 10 Drawing Sheets

(56)                  References Cited

U.S. PATENT DOCUMENTS

| | | | |
|---|---|---|---|
| 7,752,107 B1 | 7/2010 | Bent et al. | |
| 7,752,129 B2 | 7/2010 | Bent et al. | |
| 8,032,456 B1 * | 10/2011 | Bent | G06Q 20/102 |
| | | | 705/40 |
| 8,260,705 B1 * | 9/2012 | Bent | G06Q 40/06 |
| | | | 705/40 |
| 8,290,861 B1 | 10/2012 | Bent et al. | |
| 8,352,342 B1 | 1/2013 | Bent, II et al. | |
| 8,380,621 B1 * | 2/2013 | Bent | G06Q 40/02 |
| | | | 705/40 |
| 8,386,383 B1 | 2/2013 | Bent et al. | |
| 8,452,702 B1 | 5/2013 | O'Donnell et al. | |
| 8,458,089 B1 | 6/2013 | Gareis | |
| 8,571,984 B1 | 10/2013 | Bent et al. | |
| 8,583,545 B1 | 11/2013 | Bent et al. | |
| 8,589,289 B1 | 11/2013 | O'Donnell et al. | |
| 8,606,676 B1 | 12/2013 | Bent et al. | |
| 8,612,324 B1 | 12/2013 | Bent et al. | |
| 8,655,689 B1 | 2/2014 | Gareis | |
| 8,688,577 B1 * | 4/2014 | Bent | G06Q 40/06 |
| | | | 705/40 |
| 9,374,370 B1 * | 6/2016 | Bent, II | H04W 12/068 |
| 9,965,750 B1 * | 5/2018 | Bent, II | G06Q 20/3827 |
| 10,552,910 B1 | 2/2020 | Bent et al. | |
| 10,657,504 B1 | 5/2020 | Zimmerman et al. | |
| 10,832,317 B1 | 11/2020 | Bent, II et al. | |
| 2004/0143524 A1 | 7/2004 | Hilton | |
| 2006/0047593 A1 * | 3/2006 | Naratil | G06Q 40/02 |
| | | | 705/35 |
| 2010/0281490 A1 * | 11/2010 | Powell | G06Q 20/00 |
| | | | 709/204 |
| 2014/0279678 A1 | 9/2014 | Wallman | |
| 2014/0304190 A1 | 10/2014 | Maricondi | |
| 2021/0389853 A1 * | 12/2021 | Chan | G06Q 10/105 |
| 2022/0005115 A1 | 1/2022 | San Martin et al. | |
| 2022/0044315 A1 * | 2/2022 | Kothapalli | G06Q 20/29 |

* cited by examiner

Figure 3:
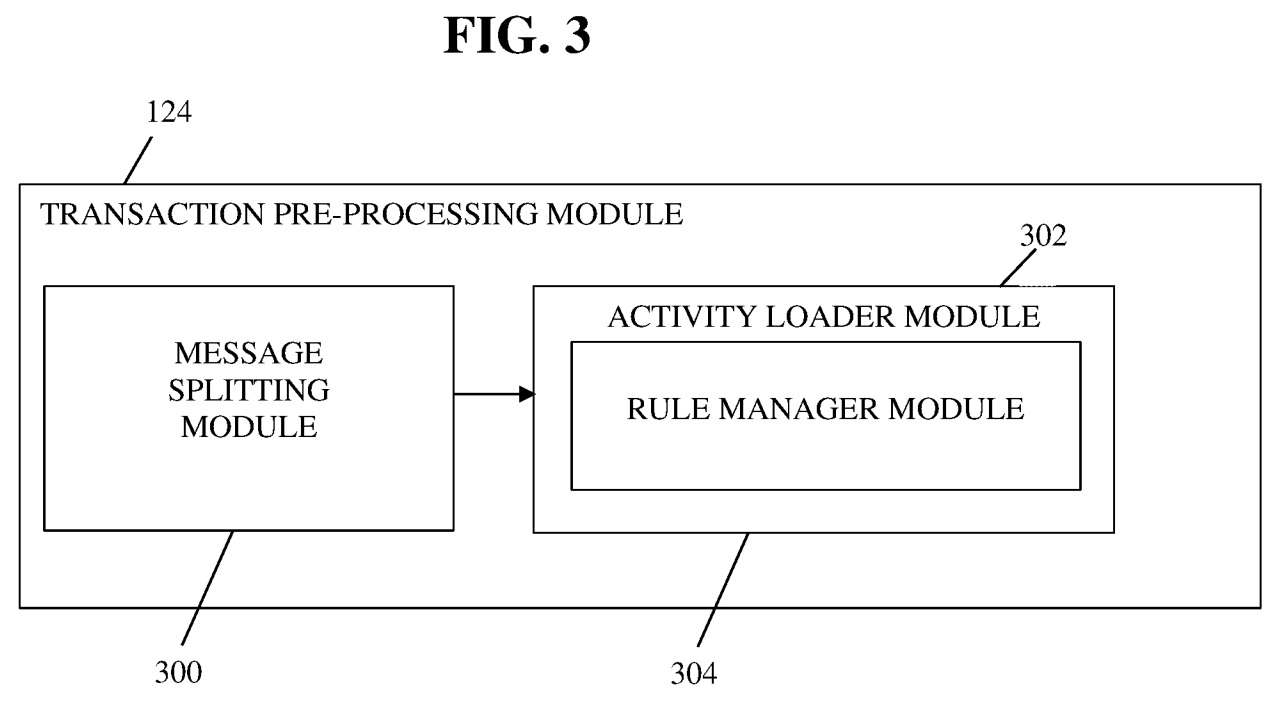

TRANSACTION PRE-PROCESSING MODULE

302

ACTIVITY LOADER MODULE

RULE MANAGER MODULE

304

MESSAGE SPLITTING MODULE

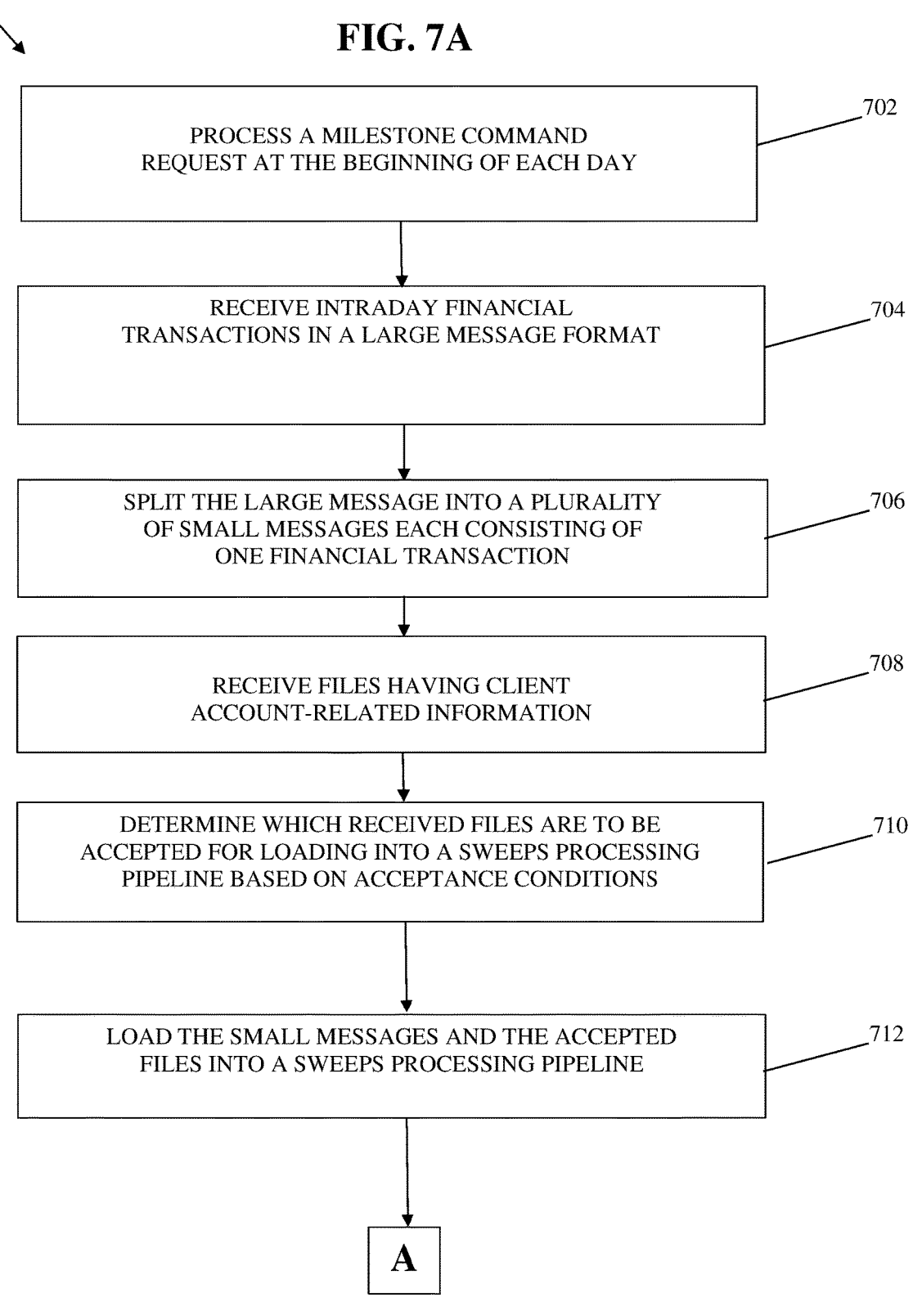

PROCESS A MILESTONE COMMAND
REQUEST AT THE BEGINNING OF EACH DAY — 702

RECEIVE INTRADAY FINANCIAL
TRANSACTIONS IN A LARGE MESSAGE FORMAT — 704

SPLIT THE LARGE MESSAGE INTO A PLURALITY
OF SMALL MESSAGES EACH CONSISTING OF
ONE FINANCIAL TRANSACTION — 706

RECEIVE FILES HAVING CLIENT
ACCOUNT-RELATED INFORMATION — 708

DETERMINE WHICH RECEIVED FILES ARE TO BE
ACCEPTED FOR LOADING INTO A SWEEPS PROCESSING
PIPELINE BASED ON ACCEPTANCE CONDITIONS — 710

LOAD THE SMALL MESSAGES AND THE ACCEPTED
FILES INTO A SWEEPS PROCESSING PIPELINE — 712

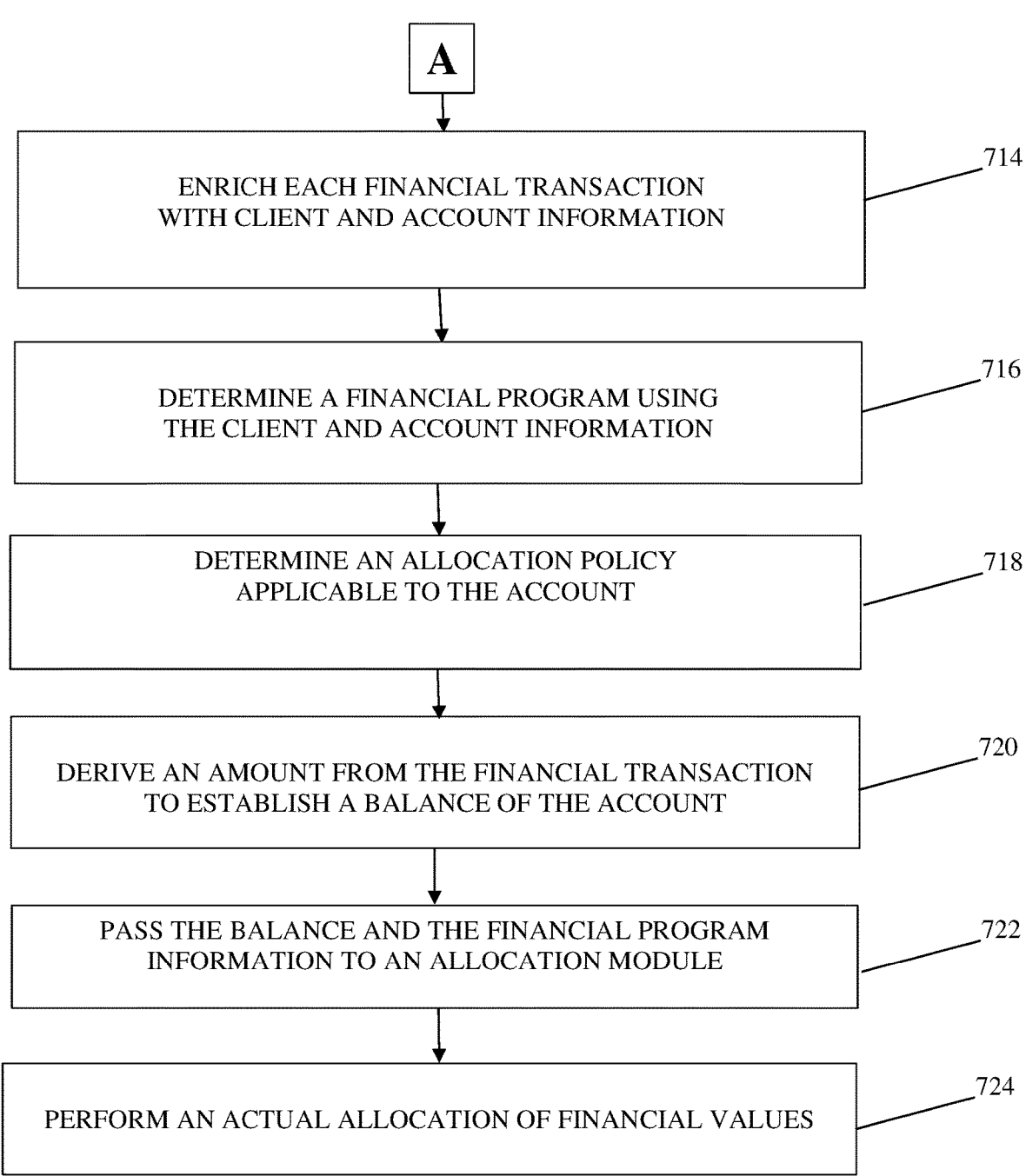

A

ENRICH EACH FINANCIAL TRANSACTION
WITH CLIENT AND ACCOUNT INFORMATION
714

DETERMINE A FINANCIAL PROGRAM USING
THE CLIENT AND ACCOUNT INFORMATION
716

DETERMINE AN ALLOCATION POLICY
APPLICABLE TO THE ACCOUNT
718

DERIVE AN AMOUNT FROM THE FINANCIAL TRANSACTION
TO ESTABLISH A BALANCE OF THE ACCOUNT
720

PASS THE BALANCE AND THE FINANCIAL PROGRAM
INFORMATION TO AN ALLOCATION MODULE
722

PERFORM AN ACTUAL ALLOCATION OF FINANCIAL VALUES
724

800

RECEIVE THE MILESTONE COMMAND REQUEST ⟋802

PROCESS THE INCOMING MESSAGES WITH
INTRADAY TRANSACTIONS USING
AN ACTIVITY LOADER MODULE ⟋804

RECORD AN OFFSET ⟋806

INITIALIZE A SET OF RECORDS WITH A NOT_STARTED
STATUS USING A FILE MANAGER MODULE ⟋808

FIG. 9
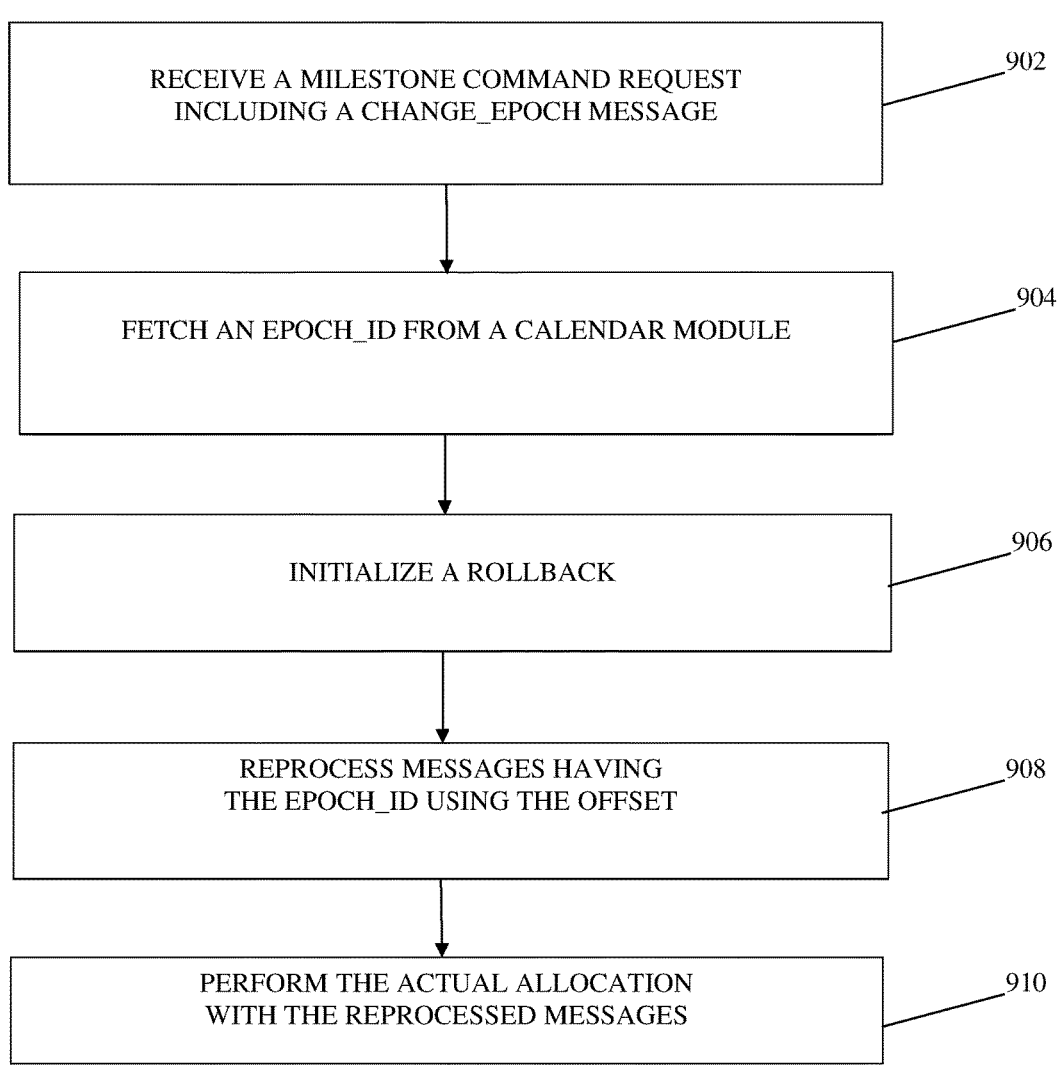
RECEIVE A MILESTONE COMMAND REQUEST
INCLUDING A CHANGE_EPOCH MESSAGE — 902
FETCH AN EPOCH_ID FROM A CALENDAR MODULE — 904
INITIALIZE A ROLLBACK — 906
REPROCESS MESSAGES HAVING
THE EPOCH_ID USING THE OFFSET — 908
PERFORM THE ACTUAL ALLOCATION
WITH THE REPROCESSED MESSAGES — 910

REAL-TIME FINANCIAL SWEEPS MANAGEMENT SYSTEM AND METHOD

FIELD OF THE DISCLOSURE

The present disclosure relates generally to financial management, and, more particularly, to a system and method configured to perform real-time financial sweeps management.

BACKGROUND OF THE DISCLOSURE

Implementing cash sweeps is a critical function of identifying and transferring uninvested cash or other financial value from a brokerage account of a client to a variety of sweep choices, such as interest-bearing bank deposits and cash, balance programs, SIPC insured money market funds, or a combination of such funds. Numerous business functions across multiple entities of financial organizations such as U.S. banks, investment management, wealth management, and organization-wide functions including Treasury activities, financial functions, and financial risk management rely on sweeps management systems for cash movements and intraday liquidity. Known sweeps management systems include multiple, extremely critical, and complex mainframe batch applications developed over decades, with connections to trading, corporate actions, and cash management functions.

Such known batch-based sweeps applications and batch processes implement sweeps functions using a batch program, which is typically run once at a particular point of time in the day, and sweeps the excess money from one account to another. Typically, the sweeps applications need to be run much earlier in the day or much later to provide enough buffer in case any technology issues arise, such as system errors and crashes.

One approach to relatively faster processing of sweeps is to stream and process the intraday transactions in real-time. However, if transactions from upstream systems are erroneous, such real-time processing can lead to incorrect settlements between a broker dealer and sweep funds, necessitating the reprocessing of a part or most of the transactions.

SUMMARY OF THE DISCLOSURE

According to an embodiment consistent with the present disclosure, a system and method are configured to perform real-time financial sweeps management.

In an embodiment, a financial sweeps management system comprises a hardware-based system processor, a system memory, and a set of modules. The system memory is configured to store instructions and is configured to provide the instructions to the hardware-based system processor. The set of modules is configured to implement the instructions provided to the hardware-based system processor. The set of modules includes a sweeps processing module, a sweeps allocation module, a file processing module, and a transaction pre-processing module. The sweeps processing module includes a policy-implementing pipeline. The file processing module is configured to process received files including client information, and to load the processed files into the sweeps processing module. The transaction pre-processing module is configured to process received financial transactions, to format the financial transactions, and to load the formatted financial transactions into the sweeps processing module. The sweeps processing module is configured to apply the processed files and the formatted financial transactions to the policy-implementing pipeline to generate sweeps allocation data. The sweeps allocation module, responsive to the sweeps allocation data, is configured to perform an allocation of financial values to implement a financial sweep.

The client information can include client demographics or client financial account information. The transaction pre-processing module can be configured to process the received financial transactions in real-time. The financial transactions can be intraday financial transactions. The sweeps processing module can include a calendar module configured to generate an epoch identification (epochID) associated with each intraday financial transaction and corresponding to an epoch during a business day. The sweeps processing module can be configured to reprocess any intraday financial transactions having a selected epochID.

The received financial transactions can be received in a single message, and the transaction pre-processing module can be configured to format the received financial transactions by converting the single message to a plurality of transaction messages, wherein each transaction message includes a single transaction. The policy-implementing pipeline can further comprise an enrichment module, a financial program determination module, an allocation policy determination module, an allocation handler module, and an allocation module. The enrichment module can be configured to associate each single transaction with a processed file. The financial program determination module can be configured to determine a financial program from a respective associated single transaction and a respective associated processed file. The allocation policy determination module can be configured to determine an allocation policy applicable to a client account associated with the client information. The allocation handler module can be configured to derive an amount from each single transaction and to establish a balance associated with the client account from the amount. The allocation module can be configured to generate the sweeps allocation data from the balance.

In another embodiment, a system comprises a file database, a transaction database, and a financial sweeps management system. The file database is configured to store a plurality of files, wherein the plurality of files include client information. The transaction database is configured to store a plurality of financial transactions. The financial sweeps management system operatively connected to the file database and the transaction database, and comprises a hardware-based system processor, a system memory, and a set of modules. The system memory is configured to store instructions and is configured to provide the instructions to the hardware-based system processor. The set of modules is configured to implement the instructions provided to the hardware-based system processor. The set of modules includes a sweeps processing module, a sweeps allocation module, a file processing module, and a transaction pre-processing module. The sweeps processing module includes a policy-implementing pipeline.

The file processing module is configured to process the plurality of files from the file database, and to load the processed files into the sweeps processing module. The transaction pre-processing module is configured to process the plurality of financial transactions from the transaction database, to format the financial transactions, and to load the formatted financial transactions into the sweeps processing module. The sweeps processing module is configured to apply the processed files and the formatted financial transactions to the policy-implementing pipeline to generate sweeps allocation data. The sweeps allocation module, responsive to the sweeps allocation data, is configured to perform an allocation of financial values to implement a financial sweep.

The client information can include client demographics or client financial account information. The transaction pre-processing module can be configured to process the received financial transactions in real-time. The financial transactions can be intraday financial transactions. The sweeps processing module can include a calendar module configured to generate an epoch identification (epochID) associated with each intraday financial transaction and corresponding to an epoch during a business day. The sweeps processing module can be configured to reprocess any intraday financial transactions having a selected epochID. The received financial transactions can be received in a single message. The transaction pre-processing module can be configured to format the received financial transactions by converting the single message to a plurality of transaction messages, wherein each transaction message includes a single transaction.

The policy-implementing pipeline can further comprise an enrichment module, a financial program determination module, an allocation policy determination module, an allocation handler module, and an allocation module. The enrichment module can be configured to associate each single transaction with a processed file. The financial program determination module can be configured to determine a financial program from a respective associated single transaction and a respective associated processed file. The allocation policy determination module can be configured to determine an allocation policy applicable to a client account associated with the client information. The allocation handler module can be configured to derive an amount from each single transaction and to establish a balance associated with the client account from the amount. The allocation module can be configured to generate the sweeps allocation data from the balance.

In a further embodiment, a method comprises loading a plurality of files into a sweeps processing module, wherein each file is associated with client information. The method further comprises receiving the plurality of financial transactions, formatting the plurality of financial transactions, loading the formatted financial transactions into the sweeps processing module, generating sweeps allocation data from the loaded files and the loaded formatted financial transactions, and responsive to the sweeps allocation data, performing an allocation of financial values to implement a financial sweep using the sweeps allocation module.

The formatting of the plurality of financial transactions can be performed in real-time. The financial transactions can be intraday financial transactions. The method can further comprise generating an epoch identification (epochID) associated with each intraday financial transaction and corresponding to an epoch during a business day, and reprocessing any intraday financial transactions having a selected epochID using the sweeps processing module. The plurality of financial transactions can be received in a single message, and the formatting can include converting the single message to a plurality of transaction messages, wherein each transaction message includes a single transaction. The method can further comprise associating each single transaction with a file, determining a financial program from a respective associated single transaction and a respective associated file, determining an allocation policy applicable to a client account associated with the client information, deriving an amount from each single transaction, establishing a balance associated with the client account from the amount, and generating the sweeps allocation data from the balance.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

BRIEF DESCRIPTION OF THE DRAWINGS

FIG. 3 is a schematic of a transaction pre-processing module.

FIGS. 7A-7B is a flowchart of a method of operation of the sweeps management system of FIG. 1.

FIG. 9 is a flowchart of a method performing a rollback of financial transactions.

It is noted that the drawings are illustrative and are not necessarily to scale.

DETAILED DESCRIPTION OF CERTAIN EMBODIMENTS OF THE DISCLOSURE

Example embodiments consistent with the teachings included in the present disclosure are directed to a system 100 and method 700 configured to perform real-time or near real-time financial sweeps management using a sweeps management system 102.

The following terms are used herein:

A "product" represents a unique sweep fund in the sweeps management system 102. Examples of a product include a Bank Deposit Program Sweep (BDPS), or any other known sweep programs, such as money market funds including AAPF, SGMT, etc.

A "program" can be a single product or a combination of products which financial value such as cash can be allocated into using a predetermined methodology. The "program" concept exists to abstract the allocation of money into single or multiple products and to allow a uniform way to allocate money in a processing pipeline.

An "AllocationPolicy" is a set of products in a program into which financial value can be allocated in multiple ways. For example, using a known Waterfall methodology, allocating money in a first fund up to a threshold is followed by other products in the program. Another known methodology is the Ratio methodology, which always maintains a fixed ratio of money among the various products in a program. Such different mechanisms to allocate money into a set of products are represented by an AllocationPolicy. The sweeps management system 102 can use one AllocationPolicy. Alternatively, the sweeps management system 102 can use a plurality of AllocationPolicys. In one example, each program has a default AllocationPolicy which is used for allocating money for all accounts that belong to the respective program. Alternatively, an AllocationPolicy can be a combination of products such as sweep funds, and a way to allocate the money among the sweep funds, such as by the Waterfall methodology or the Ratio methodology.

An "AllocationGroup" is used to govern which products can be allocated together, for example, from the same type of money such as a currency allocation, or an allocation complying with legal requirements such as financial regulations, etc.

A "WaterfallAllocationPolicy" is an Allocation Policy allocating money into a set of financial funds following a fixed rank and threshold. From rank 1 to N, funds are allocated into each product up to the threshold, and then the funds spill over into the next product. Similarly, upon a withdrawal of money, the money is taken out from the last ranked product first.

Figure 1:
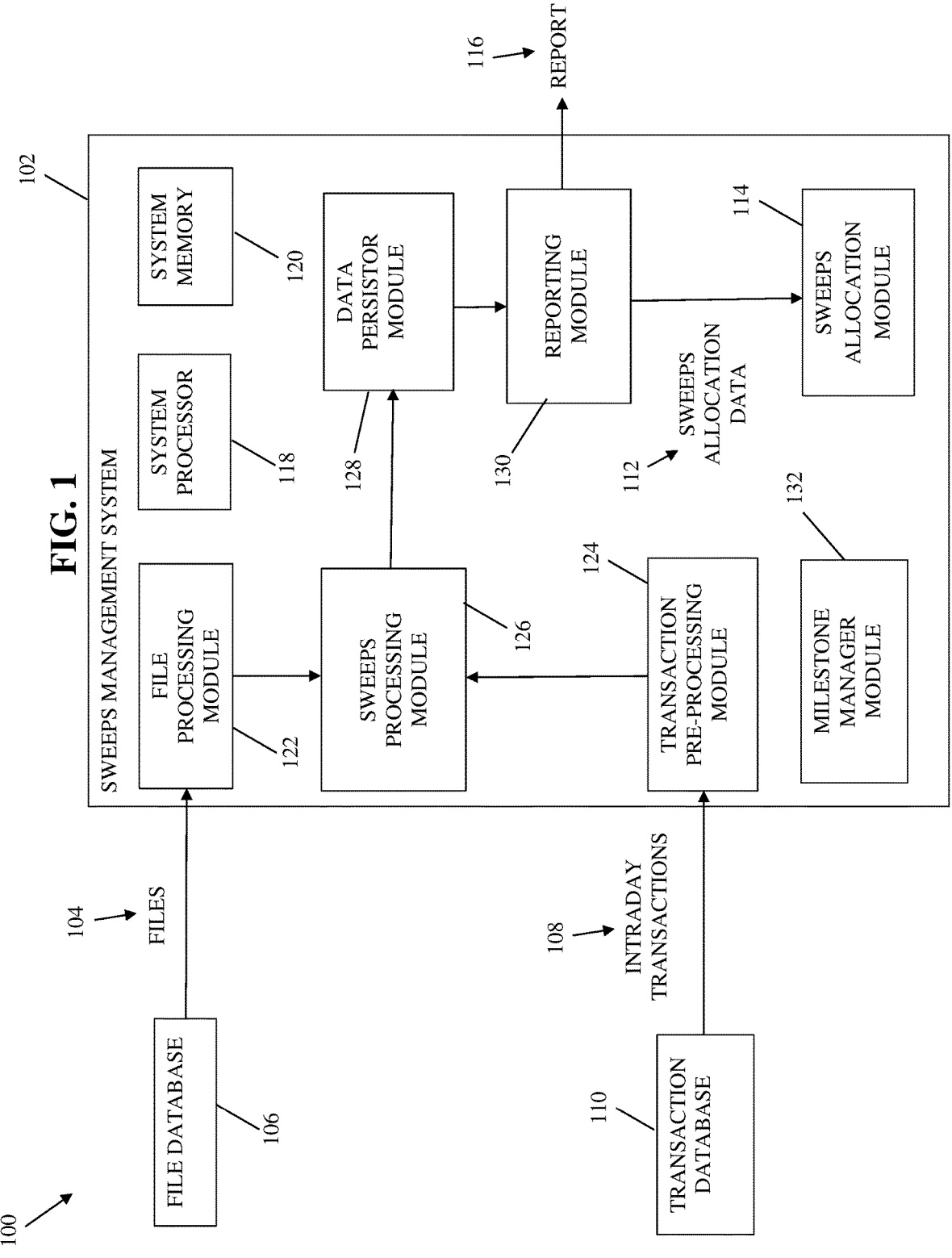
FIG. 1 is a schematic of a sweeps management system, according to an embodiment.

Referring to FIG. 1, the system 100 includes a sweeps management system 102 configured to process a plurality of files 104 from a file database 106, and configured to process a plurality of intraday transactions 108 from a transaction database 110. The system 100 is configured to operate as an allocator of financial value, such as money and sweeps including cash sweeps, according to a predetermined AllocationPolicy which is implemented in the system processor 118 by implementing code from a system memory 120. The system 100 is configured by code from the memory 120 to receive existing balances across multiple funds as inputs, and reallocate the financial value to a new set of funds according to the predetermined AllocationPolicy. The sweeps management system 102 is configured to receive the plurality of files 104 from the file database 106. The files 104 can include client information and client account-related information. For example, the client information can include demographic information regarding the financial client. In addition, the client account-related information can include a current state of the account associated with the financial client.

The sweeps management system 102 is also configured to receive the plurality of intraday financial transactions 108 from the transaction database 110. As described below, the system 100 performs real-time or near real-time financial sweeps management of the intraday transactions 108 using the files 104, and generates sweeps allocation data 112 of financial values for use by a sweeps allocation module 114. The sweeps allocation data 112 is used to determine the financial values to perform sweeps. The sweeps allocation module 114 is configured to allocate and manage financial values of financial accounts according to the sweeps allocation data 112. The financial values can include cash sweeps. The system 100 can also generate and output a report 116 to a user, such as a system administrator or a financial manager, as described below.

In addition to the sweeps allocation module 114, the sweeps management system 102 includes a system processor 118, a system memory 120, a file processing module 122, a transaction pre-processing module 124, a sweeps processing module 126, a data persistor module 128, a reporting module 130, and a milestone manager module 132. The system processor 118 coordinates the overall operation of the sweeps management system 102 and its other components 120-132 under the influence of code executing therein such as provided by the memory 120. More particularly, the system processor 118 can include code such as an operating system to execute the functions of the components 120-132 of the sweeps management system 102. The operating system can include any known operating system, such as LINUX. The system memory 120 can store the code as well as at least one database configured to store data for the other components 118, 122-132 of the sweeps management system 102. The system memory 120 can store the data in a cloud-based memory, such as any known cloud-based storage.

The file processing module 122 receives the files 104 from the file database 106. The file processing module 122 operates on and processes the files 104, as described below. The file processing module 122 loads the processed files 104 into the sweeps processing module 126. The transaction pre-processing module 124 receives the intraday transactions 108 from the transaction database 110. The transaction pre-processing module 124 operates on and processes the intraday transactions 108, as described below. The transaction pre-processing module 124 loads the processed intraday transactions 108 into the sweeps processing module 126.

Figure 5:
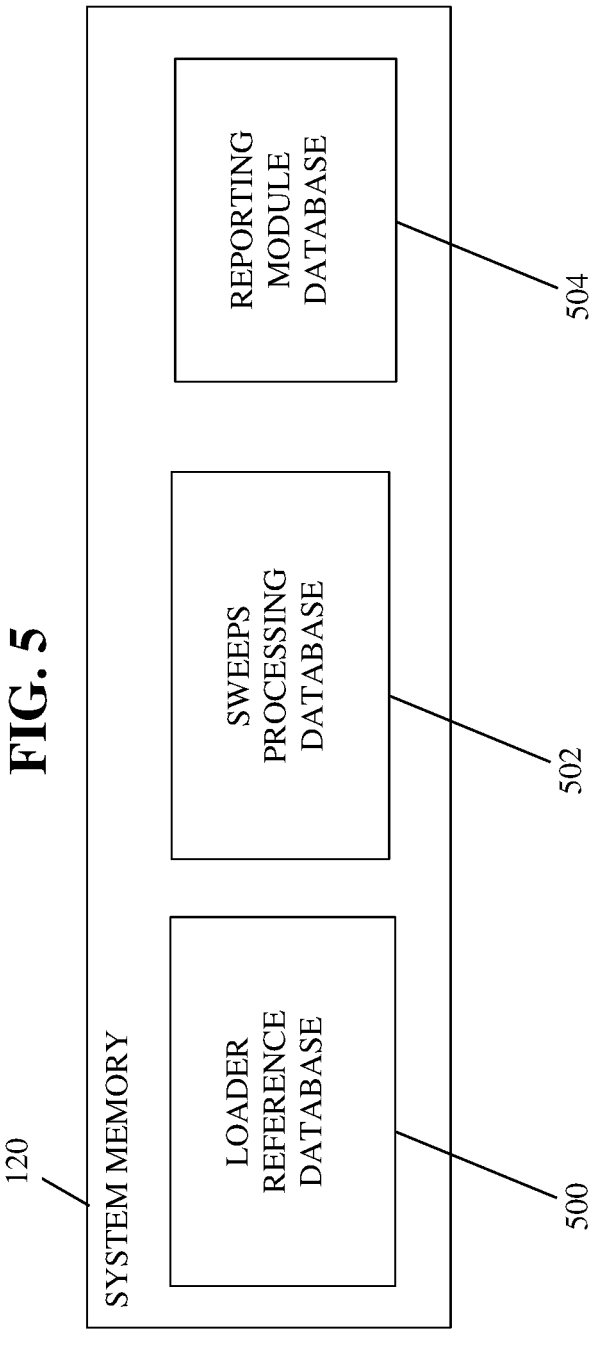
FIG. 5 is a schematic of a system memory.

The sweeps processing module 126 further operates on the processed files and intraday transactions to generate the sweeps allocation data 112 for various financial products for accounts. A product can be used to represent a unique sweep financial fund managed by the sweeps management system 102. The sweeps allocation data 112 can be associated with a time value referred to below as an "epoch." The sweeps processing module 116 is configured by code executing in the processor (which can be processor 118 or another processor or processors) and generates the sweeps allocation data 112 which includes the intraday balances for each account, and stores the balances per product per epoch. The balances per product per epoch are stored, and can be stored in the system memory 120, for instance. The data persistor module 128 persists the sweeps allocation data 112, as described below. The data persistor module 128 is responsible for storing the sweeps allocation data 112 into a set of database tables, such as a sweeps allocation table. The sweeps allocation data 112 is stored in a memory of the data persistor module 128. Alternatively, the sweeps allocation data 112 is stored in the system memory 120. For example, the sweeps allocation data 112 is stored in a sweeps processing database 502 in the system memory 120, as shown in FIG. 5 and described below.

These database tables are then used by reporting components such as the reporting module 130 to generate feeds for other systems, such as external systems. An example of an external system can include a financial management system to allow a financial manager to monitor the financial data such as the sweeps allocation data 112 processed or generated by the sweeps management system 102. After each incoming financial transaction is "allocated" or processed, the output consists of the allocation of funds among one or multiple sweep funds along with the epoch_ID that the system 100 was in when the allocation was done. Additionally, the output also contains the updated balances in each fund after the allocation has happened for a given account.

The sweeps allocation data 112 is in a JSON format which is stored into a few tables, with the main ones being a sweep allocations table and a current positions table. Alternatively, the sweeps allocation data 112 can be in any known data format. In the sweep allocations table, each allocation to a product for every key account is stored as a separate row along with other information such as business date, epochID, timestamp, and updated balances. The current positions table stores the latest position for each account for each epoch. In the case that there are two incoming transactions in the same epoch for a given account, two rows are present in the sweep allocations table detailing each allocation, but only one row in the current positions table. A new row is created in the current positions table only when the next transaction has a different epochID than the latest record in the current position table for that account.

The reporting module 130 conveys the sweeps allocation data 112 using at least one epoch. The reporting module 130 generates the sweep financial values in the sweeps allocation data 112 as of a particular epoch under the influence of code provided by the memory 120 which executes in a processor, such as, by way of example and not limitation, processor 118. Alternatively, the sweep financial values in the sweeps allocation data 112 can be generated for multiple epochs. The reporting module 130 conveys the sweeps allocation data 112 to a sweeps allocation module 114. The sweeps allocation module 114 is configured by code to perform the actual allocation of financial values for a corresponding account. For example, the actual allocation can be performed on one or more sweep funds for the same account. The actual allocation of money can be performed by the sweeps allocation module 114 according to an allocation policy associated with a given account.

In addition, the reporting module 130 can generate and output the report 116 including the sweeps allocation data 112 or other information associated with the sweeps allocation data 112 under the influence of code provided by the memory 120 which executes in a processor, such as, by way of example and not limitation, processor 118. The reporting module 130 can output the report 116 to a user, such as a system administrator or a financial manager. The reporting module 130 can include an output device configured to output the report 116. The output device can include a display configured to display the report 116. Alternatively, the output device can include a printer configured to print a physical report 116.

Figure 2:
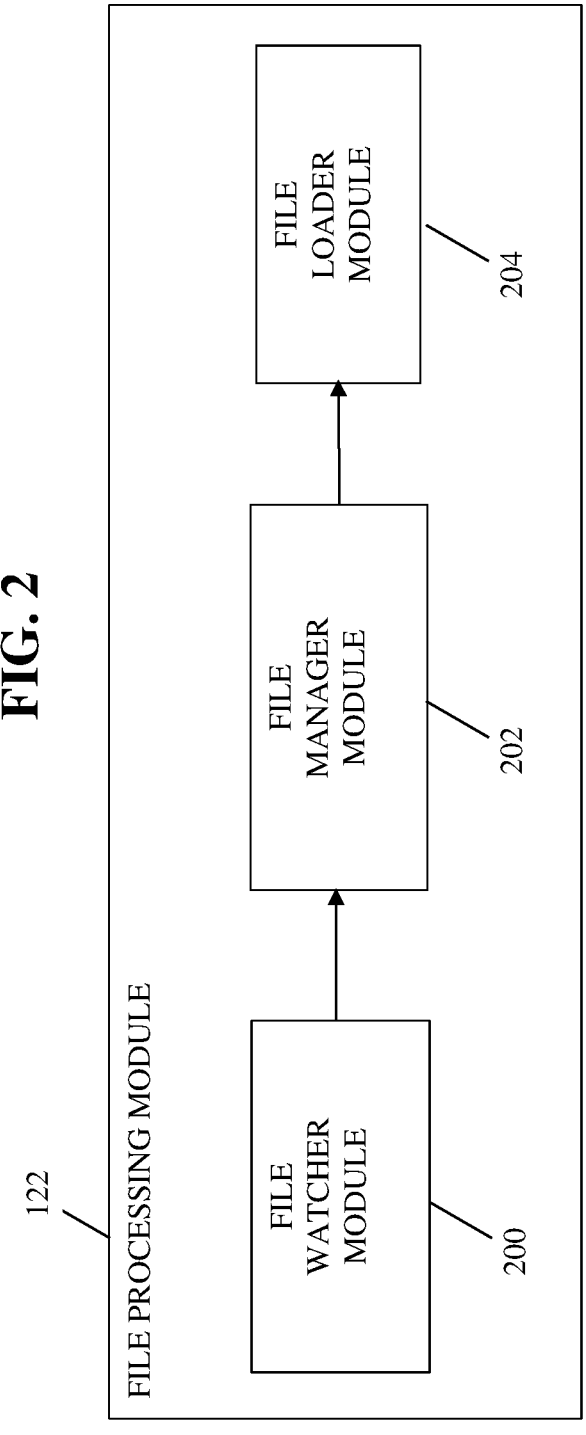
FIG. 2 is a schematic of a file processing module.

Referring to FIG. 2, the file processing module 122 includes a file watcher module 200, a file manager module 202, and a file loader module 204. These modules are each configured by code provided by the memory 120 which executes in a processor, such as, by way of example and not limitation, processor 118. The file processing module 122 processes the files 104 to safely load or reject a given one of the files 104 into the sweeps management system 102. The file watcher module 200 is configured to receive the files 104, to read a database configuration of each respective file 104, and to generate a FileLoadRequest message associated with each respective file 104. The database configurations of the files 104 can be received from the file database 106 storing such database configurations. Once received by the file processing module 122, the database configurations of the files 104 can be stored in the system memory 120. The file watcher module 200 can implement SPRING INTE-GRATIONS technology, which is an open source framework for enterprise application integration. For example, the file watcher module 200 can implement lightweight messaging within SPRING-based applications and can support integration with external systems, such as cloud-based memory, via declarative adapters.

The file watcher module 200 sends the files 104 and the FileLoadRequest messages associated with each respective file 104 to the file manager module 202. The file manager module 202 checks whether a respective file 104 that has been received contains data for a current business date, checks whether a respective file 104 has already been loaded into the sweeps management system 102, and checks whether a respective file 104 is dependent on some other file being loaded. If all of the checks pass, then the file manager module 102 sends a FileLoadResponse for a respective file 104 to at least one file loader module 204. The at least one file loader module 204 can include a plurality of file loader modules 204, with each respective file loader module 204 associated with a different type of file or a different type of file source. In response to the FileLoadResponse, a respective at least one file loader module 204 loads an associated file 104 to the sweeps processing module 126. Such processing and loading of the files 104 using respective file loader modules 204 facilitates and makes easier the onboarding of a new file 104 to be loaded into the sweeps management system 102 without duplicating the efforts for each new file 102.

The file manager module 202 can also be configured by code to define dependencies between different files 104 in the sweeps management system 102. Such defining of dependencies is useful when an ordering needs to be enforced among the various upstream files 104 which may be delivered to the sweeps management system 102 in any order.

Referring to FIG. 3, the transaction pre-processing module 124 includes a message splitting module 300 and an activity loader module 302, both configured by code provided by the memory 120 which executes in a processor, such as, by way of example and not limitation, processor 118. The message splitting module 300 receives the intraday transactions 108. The message splitting module 300 can receive the intraday transactions in real-time or near real-time from the transaction database 110. The transaction database 110 can in turn receive intraday transactions in real-time or near real-time from external financial data sources. The external financial data sources can be upstream data sources. The intraday transactions 108 can be in the form of relatively large messages with each intraday transaction 108 embedded in a respective large message. For example, the intraday transactions 108 can be financial data for financial activity received and stored in the transaction database 110 from an external Q Replication (QREP) process in messages configured in an Extensible Markup Language (XML) format. The external QREP process can be included in an external Intraday Activity System or an external RTA system.

The relatively large XML messages can consist of a varying number of financial transactions which are all encoded in a format that may not be directly processed by the sweeps management system 102. The message splitting module 300 is configured by code to enable the sweeps management system 102 to continuously read the relatively large XML messages, and then split the relatively large XML messages into multiple messages having a relatively small size and consisting of one financial transaction each. These split messages are read, processed, and forwarded to the activity loader module 302 twenty-four hours per day, for seven days per week.

The activity loader module 302 is configured to read the split messages from the message splitting module 300, filter and format the financial activities and transactions to be pre-processed financial transactions. The activity loader module 302 sends the pre-processed financial transactions to the sweeps processing module 126. The activity loader module 302 continuously receives messages from an Intraday Activity System or an external RTA system. The activity loader module 302 can send the pre-processed financial transactions to the sweeps processing module 126, for example, between a 'Start of Day' and an 'End of Day' for a current business date of operation of the sweeps management system 102.

The activity loader module 302 uses the current business date from each split message and compares all of the incoming transactions 108 to the current business date. The activity loader module 302 can be configured to only forward the transactions 108 to the sweeps processing module

126 that are settling on the current business date. Such a configuring of forwarding settling transactions 108 allows the activity loader module 302 to still be operating within the bounds of a 'business day' even while transactions are flowing continuously to the activity loader module 302.

The activity loader module 302 is configured to filter financial activities arriving upstream from the message splitting module 300 based on a settlement date, and then to send the loaded financial activities to the sweeps processing module 126. Using the activity loader module 302, the sweeps management system 102 can 'replay' financial transactions among the intraday transactions 108 in messages that have been processed for a given business day. In addition, using the activity loader module 302, the sweeps management system 102 can filter financial transactions in messages based on a predetermined criteria in case a system administrator or a financial manager wants to ignore certain types of financial transactions among the intraday transactions 108.

At the beginning of each day, the activity loader module 302 receives a MilestoneCommandRequest message from the milestone manager module 132, as described below. The MilestoneCommandRequest message is configured to instruct the activity loader module 302 to start consuming and processing the financial transactions that have been sent by the upstream systems and stored in the transaction database 110. The MilestoneCommandRequest message can include a business date representing the current business date. The activity loader module 302 records the business date from the MilestoneCommandRequest message, and uses the business date to compare with the settlement date of every financial transaction that the activity loader module 302 processes.

The activity loader module 302 is also configured to read the incoming split intraday transactions 108. The incoming split intraday transactions can be received, for example, from an APACHE KAFKA service. The activity loader module 302 can use the settlement date received from the MilestoneCommandRequest to filter out transactions that are not relevant for processing on the current date. On receiving the MilestoneCommandRequest, the activity loader module 302 can record a KAFKA offset for each partition of the inputs in a database table. Such offsets can then be used to perform an offset reset in case of a rollback, as described below.

The activity loader module 302 can also implement a smart filtering capability in order to filter some transactions and to not send such filtered transactions to the sweeps processing module 126. Such filtering can be generic and implemented by adding rules to a database table named OBJECT_FILTERING_RULES, which can be stored in the system memory 120. The OBJECT_FILTERING_RULES can include the following columns: RULE_NAME, FIELD_NAME, OPERATOR, and VALUE. The RULE_NAME column stores the name for each rule. The FIELD_NAME stores the name of the field in the incoming transaction that should be used in the filtration process. The OPERATOR column stores an operator such as =, <, or > that should be applied to the field. The VALUE column can store a constant value used for comparison with the field using the OPERATOR. If there are multiple rules in the database table, the rules can be considered in conjunction with each other. For example, the rules can be processed using the AND condition, resulting in the logical expression "Rule1 AND Rule 2".

As shown in FIG. 3, the activity loader module 302 can also include a rule manager module 304 implemented using JAVA REFLECTION which reads a field name in the FIELD_NAME column from the database table, and which derives the actual field from the incoming transaction. The rule manager module 304 uses an operator and a value, from the OPERATOR and VALUE columns, respectively, to compare the field with the value to make a filtering decision. Such an implementation allows the activity loader module 302 to filter activities based on dynamic conditions which sometimes are not known beforehand. Such an implementation provides the opportunity to apply filtering to the transactions 108 based on any fields in the incoming transaction and based on the situation on a given day.

The streaming of activities and transaction data can potentially lead to problems if the data coming into the sweeps management system 102 from upstream data sources including the transaction database 110 is erroneous. For example, erroneous data can occur in the case when upstream teams inadvertently send duplicate data or incorrect data in the stream which is loaded into the transaction database 110. Alternatively, a power or service outage or any other interruption of transaction processing can cause erroneous data to be generated. Such erroneous data can have huge financial impacts in terms of settlements, for example, between a broker dealer and a bank. To safeguard the integrity of the business interactions from such issues, even though infrequent, the sweeps management system 102 can implement the following options to resolve such erroneous data issues.

One option is to implement a complete rollback and replay of messages including financial transactions. During a complete rollback and replay, the activity loader module 302 implements code that 'resets' to the starting offsets for a current business day. Such a reset can cause the activity loader module 302 to re-process all of the financial transactions from a selected point of time specified by the starting offset, and to send the re-processed financial transactions back to the sweeps processing module 126 for continued processing.

Another option is to permit a complete rollback and a selective replay. Such a complete rollback and a selective replay can be initiated when an erroneous issue is caused due to some specific transactions types being erroneous. In the complete rollback and selective replay, the activity loader module 302 implements code that filters the financial messages while replaying the financial messages. By performing such filtering, offending transactions can be skipped in the replay process.

Figure 4:
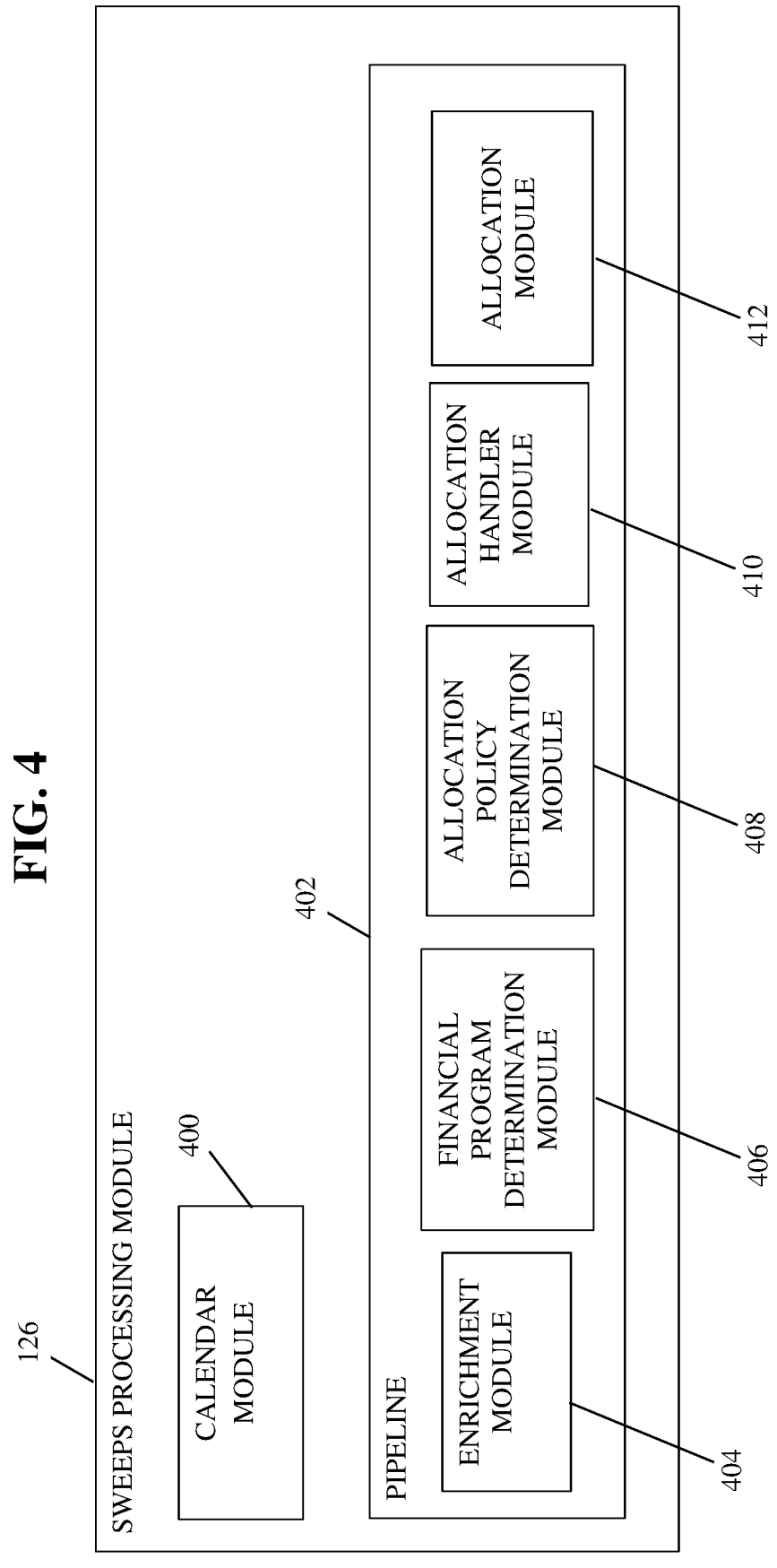
FIG. 4 is a schematic of a sweeps processing module.

Referring to FIG. 4, the sweeps processing module 126 implements predetermined rules which determine the financial funds to sweep into the appropriate financial accounts. For example, allocations of money such as cash sweeps are implemented by the predetermined rules of the sweeps processing module 126. Using the sweeps processing module 126, unified rules are implemented to combine different sweeps into one financial engine. In addition, in response to code executing therein, the sweeps processing module 126 can be configured to allocate money to one or more sweep funds for a common financial account. The sweeps processing module 126 can enable a relatively easy onboarding of new financial funds into the sweeps management system 102. The sweeps processing module 126 can also extend the ability to implement and extent sweeps to multiple currency funds. The sweeps processing module 126 can be horizontally scaled to accommodate a large number of client accounts. As described below, the sweeps processing module 126 can rollback and re-process transactions in the case of issues being presented, such as errors in upstream data.

Using the sweeps processing module 126, the sweeps management system 102 can create and override the allocation behavior at different levels; for example, a financial advisor (FA) level policy, an AccountLevel default policy, etc. The sweep management system 102 is flexible by defining a hierarchy of AllocationPolicies that can be evaluated at runtime for every account.

As shown in FIG. 4, the sweeps processing module 126 comprises a calendar module 400, and at least one policy-implementing pipeline 402. The calendar module 400 maintains a clock configured to determine a date and a time. The sweeps processing module 126 calls the calendar module 400 to fetch an identification (ID) value for an epoch. An epoch can be a duration of time such that each business day is divided into multiple epochs. A system administrator can set the duration of time to a default value, such as one hour, using an input device as described below. The epochs are represented by a number, referred to as an epochID, for instance, starting at "1" at the beginning of each business day, and which increments each time that the epoch changes. For example, during the first hour of the business day, the epochID is "1", and during the second hour of the business day, the epochID is "2", etc. The calendar module 400 can generate timestamps associated with the beginning and ending of each epoch. The calendar module 400 can store the epochIDs and their respective timestamps in the system memory 120. Various components of the sweeps management system 102 use the epochs in implementations of each respective component. The epochs allow a financial organization, such as a bank or an investment institution, to generate sweep numbers of the sweeps allocation data 112, even though there may be issues with the intraday transactions 108 which cannot be solved ordinarily.

The sweeps processing module 126 can be implemented to accommodate financial transactions from multiple data sources or teams, using at least one policy-implementing pipeline 402. Each policy-implementing pipeline 402 can operate with different data. Alternatively, each policy-implementing pipeline 402 can operate with data in different formats. Different policy-implementing pipelines 402 can include the same number of pipeline steps which can be shared among different pipelines. Alternatively, the different policy-implementing pipelines 402 can be implemented separately for each pipeline. The different policy-implementing pipelines 402 can also include a different numbers of pipeline steps.

The at least one policy-implementing pipeline 402 includes an enrichment module 404, a financial program determination module 406, an allocation policy determination module 408, an allocation handling module 410, and an allocation module 412, each configured by code provided by the memory 120 which executes in a processor, such as, by way of example and not limitation, processor 118. The enrichment module 404 enriches an incoming financial transaction 108 with client demographic data and the current state of the account maintained in the file database 106. For example, the enriching of an incoming financial transaction 108 can include associating, in a data structure such as a record, the incoming financial transaction 108 with client demographic data and the current state of the account maintained in the file database 106. Alternatively, the incoming financial transaction has only the account number along with financial amounts and other transaction-related information. The sweeps processing module 126 needs other information related to the account which is stored in a database table. The database table can be stored in the sweeps processing database 502 in the system memory 120 shown in FIG. 5, as described below. Enriching an incoming financial transaction includes looking up the account number in the database table, fetching the account-related demographic information, and adding the account-related demographic information to the incoming record or message storing the financial transaction for further processing.

The incoming financial transaction 108 can be read from the KAFKA service. The client account number can be derived from the incoming financial transaction 108. The financial program determination module 406 determines the financial program using the demographic and financial data. The AllocationPolicy determination module 408 determines the AllocationPolicy applicable to the client account. The allocation handler module 410 derives an amount from the transaction, and passes the balances and financial program information to the allocation module 412 to generate the sweeps allocation data 112 for performing the actual allocation of money. The allocation handler module 410 derives a correct amount from the incoming financial transaction 108. The allocation handler module 410 passes the correct amount along with the existing balances to the allocator module 412 which then generates the sweeps allocation data 112 to perform the actual allocation of money according to the AllocationPolicy. In an alternative embodiment, if a new feature needs to be implemented which is applicable to all of the transaction types, the new feature is implemented as a new pipeline step. For example, in an alternative embodiment, currency conversion is implemented as a pipeline step in the at least one policy-implementing pipeline 402.

The at least one policy-implementing pipeline 402 can include any one of the following pipelines: a start of day (SOD) pipeline, an MSIntraday pipeline, an ETIntraday pipeline, a Blocks pipeline, an MS insurance pipeline, and an ET Pending Trades Pipeline. The term "MS" represents "MORGAN STANLEY", and the term "ET" represents "ETRADE". The SOD pipeline is used for the processing of SOD events (MS+ET) coming from a margin rollup loader. For example, the SOD events include financial transactions that contain the starting cash balance, which is not swept, for each account on each business day. The MSIntraday pipeline is for processing intraday activities coming from the RTA system. The ETIntraday pipeline is for processing ETRADE intraday activities coming from a Libra backoffice bus. The Blocks pipeline is used to process blocks (Regulatory+ Operational) after SOD activities have been processed for the day. The MS Insurance pipeline is to process insurance redemptions coming from a special file send by an insurance team. The ET Pending Trades pipeline is used to process the ET pending trades which are not available on the Libra stream.

As described below, to perform a rollback, the sweeps processing module 126 receives a MilestoneCommandRequest from the milestone manager module 132 with a CHANGE_EPOCH message. On receiving the CHANGE_EPOCH message, the sweeps processing module 126 accesses the calendar module 400 through a call, such as a webservice call. Such a call fetches the latest epoch for the current day. The latest epoch is stored in a memory of the sweeps processing module 126. Alternatively, the latest epoch is stored in the system memory 120. In another embodiment, the latest epoch is stored in a 'SystemContext' data structure of the sweeps processing module 126 where other information such as business date and other reference data are stored. Each incoming transaction 108 is stamped or otherwise associated with the epochID of the latest epoch. For example, the stamping or associating of the incoming transaction 108 with the epochID of the latest epoch is performed by the enrichment module 404.

In one embodiment consistent with this disclosure, the sweeps processing module 126 stores an AccountState Object in a memory of the sweeps processing module 126. Alternatively, the sweeps processing module 126 stores the AccountState Object in a sweeps processing database 502, described below. In addition, the sweeps processing module 126 can store the AccountState Object in the system memory 120. The AccountState Object can store all of the intraday balances for each client account, and also stores the balances per product, per epoch. The AccountState Object can be stored internally using a HashMap datastructure with the epochID as the key, and the product balances as the value. For example, the AccountState Object can be implemented as follows:

```
AccountState {
    currentBalances: Map<EpochID, Map<ProductID, Balance>>;
}
```

When a new transaction is processed by the sweeps processing module 126, the updated balances up to that point of time can be stored in the HashMap using the epochID enriched by the enrichment module 404. In case the Hash-Map does not contain the epochID, then a new entry is made in the HashMap with the new epochID and a balance map. Such a circumstance of the HashMap not containing the epochID can occur when the new transaction being processed is a first transaction for the client account after an epoch change. By implementing and processing epochs using epochIDs, the sweeps management system 102 effectively creates multiple checkpoints for each client account during each day. Such epochIDs facilitate the ability of the sweeps management system 102 to go back to an earlier checkpoint and to re-process transactions 108 from that point onwards during a rollback.

Referring back to FIG. 1, the data persistor module 128 persists the sweeps allocation data 112. In particular, the transactions and epochs processed by the sweeps processing module 126 are conveyed to the data persistor module 128. The data persistor module 128 persists the processed transactions and their associated balances along with the corresponding epoch having an epochID. The reporting module 130 can then use the epoch specified by the epochID to generate the sweep numbers as of a particular epoch.

Referring to FIG. 5, the system memory 120 can include a loader reference database 500, a sweeps processing database 502, and a reporting module database 504. The loader reference database 500 can record the KAFKA offset used by the activity loader module 302 for each partition of the inputs in a database table. The database table used by the activity loader module 302 can also be stored in the loader reference database 500. In addition, the database table maintaining the OBJECT_FILTERING_RULES can be stored in the loader reference database 500.

The sweeps processing database 502 can store the AccountState Object, all of the intraday balances for each client account, and the balances per product, per epoch. The AccountState Object can be stored in the sweeps processing database 502 using a HashMap datastructure with the epochID as the key, and the product balances as the value. The sweeps processing database 502 can store the processed files 104 loaded by the file processing module 122. The sweeps processing database 502 can also store the processed intraday transactions 108 from the transaction pre-processing module 124. The reporting module database 504 can store the processed transactions and their associated balances along with the corresponding epoch having an epochID, for use by the reporting module 130.

Figure 6:
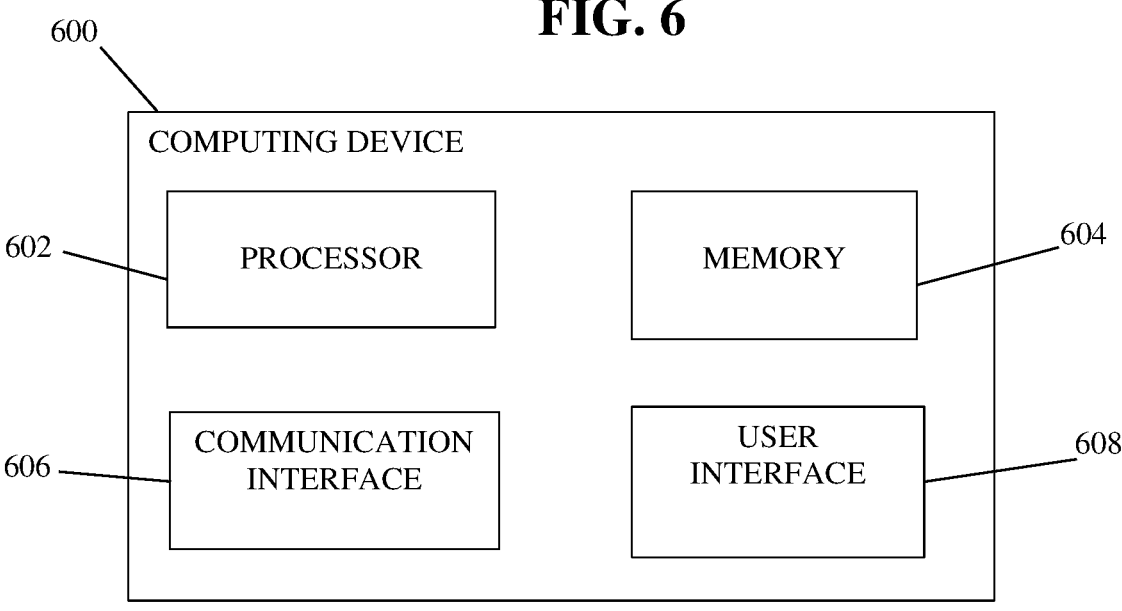
FIG. 6 is a schematic of a computing device used in the embodiment.

FIG. 6 illustrates a schematic of a computing device 600 including a processor 602 having code therein, a memory 604, and a communication interface 606. Optionally, the computing device 600 includes a user interface 608, such as an input device, an output device, or an input/output device. The processor 602, the memory 604, the communication interface 606, and the user interface 608 are operatively connected to each other via any known connections, such as a system bus, a network, etc. Any component, combination of components, and modules of the system 100 in FIGS. 1-5 can be implemented by a respective computing device 600. For example, each of the components 118-132 shown in FIG. 1, as well as the components shown in FIGS. 2-5, can be implemented by a respective computing device 600 shown in FIG. 6 and described below.

It is to be understood that the computing device 600 can include different components. Alternatively, the computing device 600 can include additional components. In another alternative embodiment, some or all of the functions of a given component can instead be carried out by one or more different components. The computing device 600 can be implemented by a virtual computing device. Alternatively, the computing device 600 can be implemented by one or more computing resources in a cloud computing environment. Additionally, the computing device 600 can be implemented by a plurality of any known computing devices.

The processor 602 can be a hardware-based processor implementing a system, a sub-system, or a module. The processor 602 can include one or more general-purpose processors. Alternatively, the processor 602 can include one or more special-purpose processors. The processor 602 can be integrated in whole or in part with the memory 604, the communication interface 606, and the user interface 608. In another alternative embodiment, the processor 602 can be implemented by any known hardware-based processing device such as a controller, an integrated circuit, a micro-chip, a central processing unit (CPU), a microprocessor, a system on a chip (SoC), a field-programmable gate array (FPGA), or an application-specific integrated circuit (ASIC). In addition, the processor 602 can include a plurality of processing elements configured to perform parallel processing. In a further alternative embodiment, the processor 602 can include a plurality of nodes or artificial neurons configured as an artificial neural network. The processor 602 can be configured to implement any known artificial neural network, including a convolutional neural network (CNN).

The memory 604 can be implemented as a non-transitory computer-readable storage medium such as a hard drive, a solid-state drive, an erasable programmable read-only memory (EPROM), a universal serial bus (USB) storage device, a floppy disk, a compact disc read-only memory (CD-ROM) disk, a digital versatile disc (DVD), cloud-based storage, or any known non-volatile storage.

The code of the processor 602 can be stored in a memory internal to the processor 602. The code can be instructions implemented in hardware. Alternatively, the code can be instructions implemented in software. The instructions can be machine-language instructions executable by the processor 602 to cause the computing device 600 to perform the functions of the computing device 600 described herein. Alternatively, the instructions can include script instructions executable by a script interpreter configured to cause the processor 602 and computing device 600 to execute the instructions specified in the script instructions. In another alternative embodiment, the instructions are executable by the processor 602 to cause the computing device 600 to execute an artificial neural network. The processor 602 can be implemented using hardware or software, such as the code. The processor 602 can implement a system, a sub-system, or a module, as described herein. The same is true of any code stored in the memory 120.

The memory 604 can store data in any known format, such as databases, data structures, data lakes, or network parameters of a neural network. The data can be stored in a table, a flat file, data in a filesystem, a heap file, a B+ tree, a hash table, or a hash bucket. The memory 604 can be implemented by any known memory, including random access memory (RAM), cache memory, register memory, or any other known memory device configured to store instructions or data for rapid access by the processor 602, including storage of instructions during execution.

The communication interface 606 can be any known device configured to perform the communication interface functions of the computing device 600 described herein. The communication interface 606 can implement wired communication between the computing device 600 and another entity. Alternatively, the communication interface 606 can implement wireless communication between the computing device 600 and another entity. The communication interface 606 can be implemented by an Ethernet, Wi-Fi, Bluetooth, or USB interface. The communication interface 606 can transmit and receive data over a network and to other devices using any known communication link or communication protocol.

The user interface 608 can be any known device configured to perform user input and output functions. The user interface 608 can be configured to receive an input from a user. Alternatively, the user interface 608 can be configured to output information to the user. The user interface 608 can be a computer monitor, a television, a loudspeaker, a computer speaker, or any other known device operatively connected to the computing device 600 and configured to output information to the user. A user input can be received through the user interface 608 implementing a keyboard, a mouse, or any other known device operatively connected to the computing device 600 to input information from the user. Alternatively, the user interface 608 can be implemented by any known touchscreen. The computing device 600 can include a server, a personal computer, a laptop, a smartphone, or a tablet.

Referring to FIGS. 7A-7B, a method 700 of operation of the system 100 of FIG. 1 includes the step 702 of processing a MilestoneCommandRequest at the beginning of each day, and receiving the intraday financial transactions 108 in a relatively large message format from the transaction database 110 in step 704. The method 700 then splits the relatively large message into a plurality of small messages in step 706 using the message splitting module 300, with each of the small messages consisting of one financial transaction. In an alternative arrangement, single-transaction messages can be defined from the content of the larger message received at step 704 rather than splitting the larger message. The method 700 receives the files 104 having client account-related information, such as client demographics and the status of the client account, at the file processing module 122 in step 708. The method 700 determines which of the received files 104 are to be accepted using the activity loading module 302 in step 710. The acceptance or rejection of a given received file 104 determines which of the received files 104 are loaded into the sweeps processing module 126 by the activity loading module 302. The method 700 then loads the small messages with intraday transactions 108 and loads the accepted files 104 into a policy-implementing pipeline 402 of the sweeps processing module 126 in step 712.

The method 700 enriches each financial transaction with the client and account information using an enrichment module 404 of the policy-implementing pipeline 402 in step 714. The method 700 then determines a financial program using the client and account information in step 716, with the determination of the financial program performed by the financial program determination module 406 of the policy-implementing pipeline 402. The method 700 determines an allocation policy application to the account in step 718 using an allocation policy determination module 408 of the policy-implementing pipeline 402. The method 700 derives an amount such as a sweeps value from the financial transaction using the allocation handler module 410 of the policy-implementing pipeline 402 in step 720. The derivation of the amount establishes a balance of the client account. The method 700 passes the balance and the financial program information to an allocation module 412 of the policy-implementing pipeline 402 in step 722 to generate the sweeps allocation data 112. The sweeps allocation data 112, including the balance and financial program information, can be further processed by the data persistor module 128 and the reporting module 130. The method 700 then performs an actual allocation of financial values in step 724 using the sweeps allocation module 114 applying the sweeps allocation data 112 including the balance and the financial program information from the allocation module 412.

Figure 8:
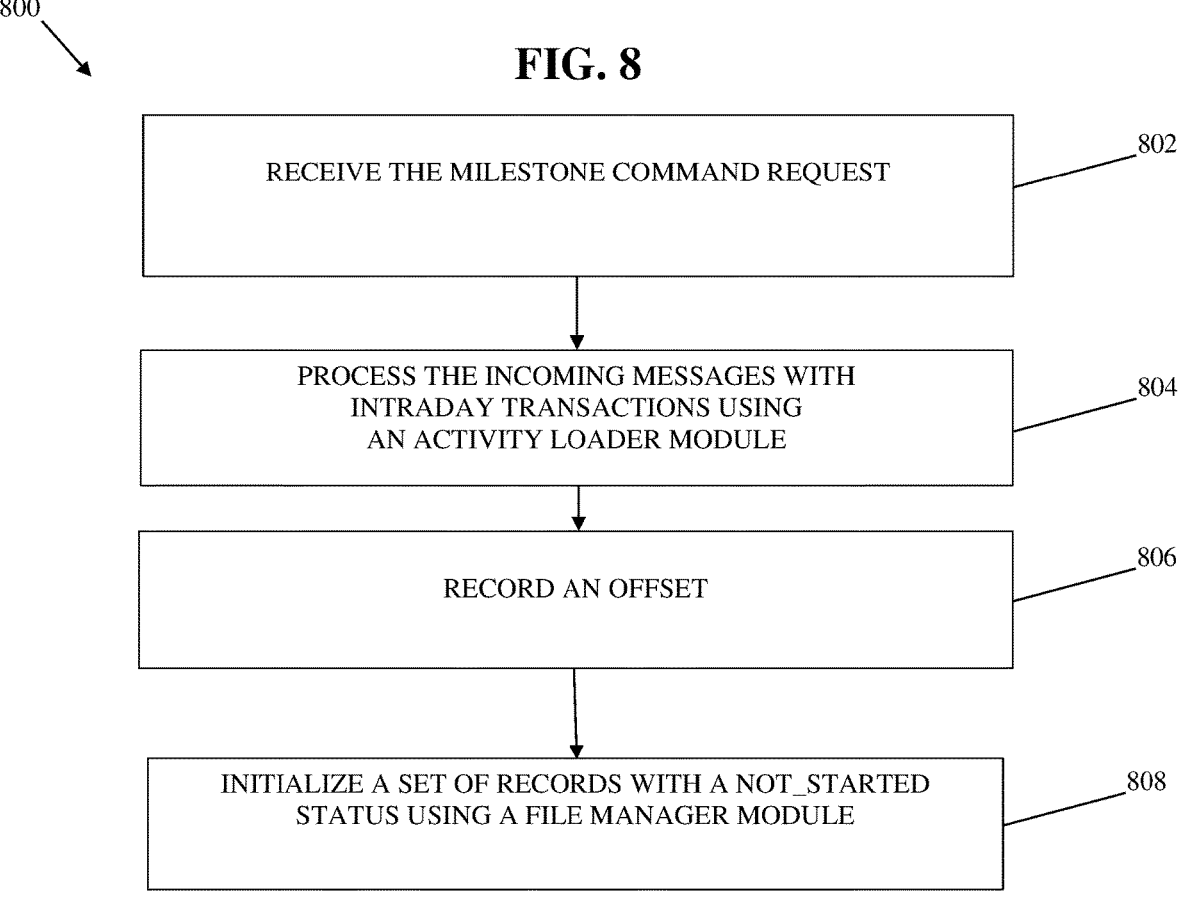
FIG. 8 is a flowchart of a method initializing sweeps management at the beginning of each day.

Referring to FIG. 8, a method 800 consistent with the present disclosure performs step 702 in FIG. 7A to initialize sweeps management by the system 100 at the beginning of each day in response to the MilestoneCommandRequest. At the beginning of each day, the activity loader module 302 receives a MilestoneCommandRequest message from the milestone manager module 132 in step 802. The MilestoneCommandRequest message instructs the activity loader module 302 to start consuming and processing the financial transactions 108 in the incoming split messages in step 804 that have been generated by the message splitting module 300 from the relatively large messages sent by the upstream systems and stored in the transaction database 110. The MilestoneCommandRequest message can include a date representing the current business date. The activity loader module 302 records the business date from the MilestoneCommandRequest message, and uses the business date to compare with the settlement date of every financial transaction that the activity loader module 302 processes.

The method 800 then records the offset in step 806 using the activity loader module 302. In response to the MilestoneCommandRequest, the method 800 instructs the file manager module 202 to initialize a set of records of the files 104 with NOT_STARTED status for a given business date in step 808. As each file 104 is loaded successfully into the sweeps processing module 126 by a respective at least one file loader module 204, a FileLoadStatusResponse message from the respective at least one file loader module 204 changes the loading status of the respective file 104 to COMPLETED. In case of a rejection of a given file 104, the status changes to FAILED.

Referring to FIG. 9, a method 900 performs a rollback of financial transactions in response to the MilestoneCommandRequest from the milestone manager module 132 having a CHANGE_EPOCH message. The milestone manager module 132 automatically generates the MilestoneCommandRequest having a CHANGE_EPOCH message in response to a set of predetermined rules which indicate when erroneous transactions have occurred. Alternatively, a system administrator or a financial manager controls the milestone manager module 132 using an input device configured to generate the MilestoneCommandRequest having a CHANGE_EPOCH message in response to user inputs. For example, the system administrator or the financial manager can monitor the transaction processing of the intraday transactions 108 by the system 100. The monitoring of the processing is performed using the reporting module 130 generating and outputting reports of the transaction processing. Upon finding suspected or actually detected erroneous transactions determined by the system administrator or the financial manager, the system administrator or the financial manager can manually initiate the rollback of a subset of the intraday transactions 108 using an input device associated with the milestone manager module 132.

Typically, a system administrator or a financial manager are included in a sweeps team for monitoring the processing of financial transactions and sweeps. In one example of operation of the system 10, if the sweeps team is notified of glitches or technology outages resulting in erroneous data coming into the financial management system of a financial institution, the sweeps team in consultation with business users can decide to initiate rollbacks and replays to restore the financial management system 10 to a healthy state. Using the system 10, there are multiple options for rolling back the financial management system to be restored based on different levels of complexity. Based on the situation, the sweeps team can select the best method to rollback. As described above, rollbacks are implemented using automation as well as being initiated from a user interface by a member of the sweeps team, such as a system administrator or a financial manager. Additionally, the system 10 generates downstream data using the epochID as of any point in time in the day.

The sweeps processing module 126 receives the MilestoneCommandRequest with the CHANGE_EPOCH message in step 902. On receiving the CHANGE_EPOCH message, the sweeps processing module 126 accesses the calendar module 400 through a call, such as a webservice call. Such a call fetches the latest epoch having an epochID or epoch_ID for the current day in step 904. The latest epoch can be selected according to the user inputs received from a system administrator or a financial manager, as described above. The latest epoch is stored in a memory of the sweeps processing module 126. Alternatively, the latest epoch is stored in the system memory 120. In another embodiment, the latest epoch is stored in a 'SystemContext' data structure of the sweeps processing module 126 where other information such as business date and other reference data are stored. Each incoming transaction 108 is stamped or otherwise associated with the epochID of the latest epoch. For example, the stamping or associating of the incoming transaction 108 with the epochID of the latest epoch is performed by the enrichment module 404.

The method 900 then initiates a rollback in step 906 using the sweeps processing module 126, and reprocesses any messages with financial transactions having the epochID using an offset in step 908. The reprocessing of financial transactions can have an extremely high throughput using an SQL-based Server, such as an SQL Server 2019's In-Memory table feature to reprocess the financial transactions. The offset was previously obtained and recorded in step 806 of FIG. 8. The method 900 performs the actual allocation of financial values with the reprocessed messages in step 910 using the sweeps processing module 126 in conjunction with the sweeps allocation module 114 as described above.

Using the system 100 and methods 700, 800, 900, known mainframe-based, batch applications of sweeps management can be replaced by a modern, scalable, resilient, cloud-ready system 100. The system 100 and its components described above can be implemented by a distributed system configuration. The system 100 can perform sweep calculations and sweeps allocations by streaming and processing the intraday financial transactions 108 in real-time or near real-time. For example, millions of transactions can be reprocessed in a very short amount of time, such as twenty minutes, in case of a power or service outage, or the detection of erroneous data.

Portions of the methods described herein can be performed by software or firmware in machine readable form on a tangible (e.g., non-transitory) storage medium. For example, the software or firmware can be in the form of a computer program including computer program code adapted to cause the system to perform various actions described herein when the program is run on a computer or suitable hardware device, and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving." and variations thereof herein, is meant to encompass the items listed thereafter and equivalents thereof as well as additional items.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A financial sweeps management system, comprising:
a hardware-based system processor;
a system memory configured to store instructions and configured to provide the instructions to the hardware-based system processor; and
a set of modules configured to implement the instructions provided to the hardware-based system processor, the set of modules including:
a sweeps processing module including a policy-implementing pipeline and a calendar module, the sweeps processing module being responsive to the detecting of an erroneous transaction among a plurality of transactions stored in a transaction database of a transaction system, to generate a rollback request to the sweeps processing module, the sweeps processing module configured to filter the detected erroneous transaction based on a set of predetermined rules and to restore the transaction database of the transaction system to a healthy state in case of the erroneous transaction detected during processing of financial transactions by the transaction system, and the calendar module is responsible for generating an epoch identification (epochID) associated with each financial transaction and corresponding to an epoch during a business day, with the epochID being an incrementing identification value which is used to rollback the financial transactions and restore the transaction database of the transaction system back to the healthy state;
a sweeps allocation module;
a file processing module configured to receive and process files including client information, and to load the processed files into the sweeps processing module; and
a transaction pre-processing module configured to receive and process financial transactions streaming in real-time, to format the financial transactions, and to load the formatted financial transactions into the sweeps processing module,
wherein the sweeps processing module is configured to apply the processed files and the formatted financial transactions to the policy-implementing pipeline to generate sweeps allocation data in real-time,
wherein the sweeps allocation module, responsive to the sweeps allocation data, is configured to perform an allocation of financial values to implement a financial sweep based on different levels of complexity, and
wherein the sweeps processing module, responsive to the rollback request, rolls back the financial transactions by reprocessing at least one million financial transactions within twenty minutes before the end of an intraday period and having a selected epochID for a corresponding epoch including the detected erroneous transaction, thereby filtering the erroneous transaction by skipping the detected erroneous transaction based on the selected epochID and selectively restoring the transaction database to the healthy state.

2. The sweeps management system of claim 1, wherein the file processing module further comprises:
a file manager module configured to define dependencies of the received files to order the received files for loading into the sweeps processing module.

3. The sweeps management system of claim 1, wherein the financial transactions are intraday financial transactions.

4. The sweeps management system of claim 1, wherein the received financial transactions are received in a single message; and
wherein the transaction pre-processing module is configured to format the received financial transactions by converting the single message to a plurality of transaction messages, wherein each transaction message includes a single transaction.

5. The sweeps management system of claim 4, wherein the plurality of operatively interconnected modules of the policy-implementing pipeline further comprises:
an enrichment module configured to associate each single transaction with a processed file;
a financial program determination module configured to determine a financial program from a respective associated single transaction and a respective associated processed file;
an allocation policy determination module configured to determine an allocation policy applicable to a client account associated with the client information;
an allocation handler module configured to derive an amount from each single transaction and to establish a balance associated with the client account from the amount; and
an allocation module configured to generate the sweeps allocation data from the balance.

6. A system, comprising:
a file database configured to store a plurality of files, wherein the plurality of files includes client information;
a transaction database configured to store a plurality of financial transactions of a transaction system; and
a financial sweeps management system operatively connected to the file database and the transaction database, comprising:
a hardware-based system processor;
a system memory configured to store instructions and configured to provide the instructions to the hardware-based system processor; and
a set of modules configured to implement the instructions provided to the hardware-based system processor, the set of modules including:
a sweeps processing module including a policy-implementing pipeline and a calendar module, the sweeps processing module being responsive to the detecting of an erroneous transaction among the plurality of financial transactions stored in the transaction database of the transaction system, to generate a rollback request to the sweeps processing module, the sweeps processing module configured to filter the detected erroneous transaction based on a set of predetermined rules and to restore the transaction database of the transaction system to a healthy state in case of the erroneous transaction detected during processing of financial transactions by the transaction system, and the calendar module is responsible for generating an epoch identification (epochID) associated with each financial transaction corresponding to an epoch during a business day, with the epochID being an incrementing identification value which is used to rollback the financial transactions and restore the transaction database of the transaction system back to the healthy state;

a sweeps allocation module;

a file processing module configured to process the plurality of files from the file database, and to load the processed files into the sweeps processing module; and a transaction pre-processing module configured to process the plurality of financial transactions streaming in real-time from the transaction database, to format the financial transactions, and to load the formatted financial transactions into the sweeps processing module, wherein the sweeps processing module is configured to apply the processed files and the formatted financial transactions to the policy-implementing pipeline to generate sweeps allocation data in real-time, wherein the sweeps allocation module, responsive to the sweeps allocation data, is configured to perform an allocation of financial values to implement a financial sweep based on different levels of complexity, and wherein the sweeps processing module, responsive to the rollback request, rolls back the financial transactions by reprocessing at least one million financial transactions within twenty minutes before the end of an intraday period and having a selected epochID for a corresponding epoch including the detected erroneous transaction, thereby filtering the erroneous transaction by skipping the detected erroneous transaction based on the selected epochID and selectively restoring the transaction database to the healthy state.

7. The system of claim 6, wherein the client information includes client demographics or client financial account information.

8. The system of claim 6, wherein the financial transactions are intraday financial transactions.

9. The system of claim 6, wherein the received financial transactions are received in a single message; and wherein the transaction pre-processing module is configured to format the received financial transactions by converting the single message to a plurality of transaction messages, wherein each transaction message includes a single transaction.

10. The system of claim 9, wherein the plurality of operatively interconnected modules of the policy-implementing pipeline further comprises:

an enrichment module configured to associate each single transaction with a processed file;

a financial program determination module configured to determine a financial program from a respective associated single transaction and a respective associated processed file;

an allocation policy determination module configured to determine an allocation policy applicable to a client account associated with the client information;

an allocation handler module configured to derive an amount from each single transaction and to establish a balance associated with the client account from the amount; and an allocation module configured to generate the sweeps allocation data from the balance.

11. A computer-based method, comprising:

loading a plurality of files into a sweeps processing module including a policy-implementing pipeline and a calendar module, wherein each file is associated with client information;

receiving a plurality of financial transactions in a transaction database of a transaction system;

processing the received plurality of financial transactions streaming in real-time;

formatting the plurality of financial transactions;

loading the formatted financial transactions into the sweeps processing module;

processing the formatted financial transactions using a set of predetermined rules;

detecting an erroneous transaction among the formatted financial transactions;

responsive to the detecting of the erroneous transaction, generating a rollback request;

processing the loaded files and the loaded formatted financial transactions by the policy-implementing pipeline;

generating sweeps allocation data in real-time from the loaded files and the loaded formatted financial transactions using the policy-implementing pipeline;

responsive to the sweeps allocation data, performing an allocation of financial values to implement a financial sweep based on different levels of complexity using the sweeps allocation module, generating an epoch identification (epochID) associated with each financial transaction and corresponding to an epoch during a business day using the calendar module with the epochID being an incrementing identification value which is used to rollback the financial transactions, receiving the rollback request, and responsive to the rollback request, rolling back the financial transactions by reprocessing at least one million financial transactions within twenty minutes before the end of an intraday period and having a selected epochID for a corresponding epoch including the detected erroneous transaction, thereby filtering the erroneous transaction based on a set of predetermined rules by skipping the detected erroneous transaction based on the selected epochID and restoring the transaction database of the transaction system to a healthy state in case of the erroneous transaction detected during processing of financial transactions by the transaction system and selectively restoring the transaction database to the healthy state.

12. The computer-based method of claim 11, wherein the financial transactions are intraday financial transactions.

13. The computer-based method of claim 11, wherein the plurality of financial transactions is received in a single message; and wherein the formatting includes converting the single message to a plurality of transaction messages, wherein each transaction message includes a single transaction.

14. The computer-based method of claim 13, wherein the processing of the loaded files and the loaded formatted financial transactions includes:

associating each single transaction with a file;

determining a financial program from a respective associated single transaction and a respective associated file;

determining an allocation policy applicable to a client account associated with the client information;

deriving an amount from each single transaction;

establishing a balance associated with the client account from the amount; and generating the sweeps allocation data from the balance.

\* \* \* \* \*